United States Patent [19]

Okugawa et al.

[11] Patent Number: 5,086,406
[45] Date of Patent: Feb. 4, 1992

[54] CIRCUIT ARRANGEMENT FOR DECIMAL ARITHMETIC

[75] Inventors: Shinichi Okugawa, Tokyo; Shigenobu Sugimoto, Gunma, both of Japan

[73] Assignee: NEC Corporation, Tokyo, Japan

[21] Appl. No.: 544,863

[22] Filed: Jun. 28, 1990

[30] Foreign Application Priority Data

Jun. 28, 1989 [JP] Japan .................................. 1-163679

[51] Int. Cl.⁵ ............................................... G06F 7/50
[52] U.S. Cl. .................................... 364/781; 364/768
[58] Field of Search ................ 364/781, 768, 784, 778

[56] References Cited

U.S. PATENT DOCUMENTS 4,811,272 3/1989 Wolrich et al. ...................... 364/768
4,849,921 7/1989 Yasumoto et al. ................... 364/768
4,866,656 9/1989 Hwang ................................. 364/768

OTHER PUBLICATIONS

Chu, "Organization of a Decimal Arithmetic Unit," Computer Organization and Microprogramming, Prentice-Hall, Inc., 1972, pp. 230–243.

Primary Examiner—David H. Malzahn
Attorney, Agent, or Firm—Foley & Lardner

[57] ABSTRACT

A circuit for performing decimal subtraction at high speed has an execution time which is independent of the existence of a borrow condition. The subtraction circuit is particularly suited for use in microcoded computer circuits.

2 Claims, 2 Drawing Sheets

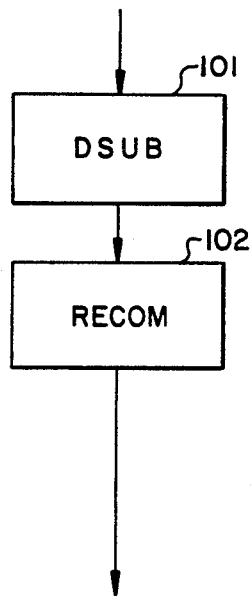
FIG. 5
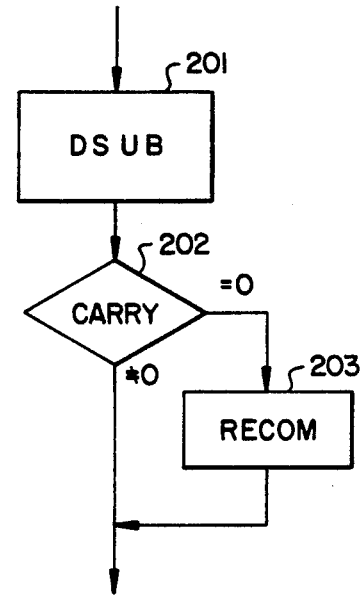
FIG. 1
PRIOR ART
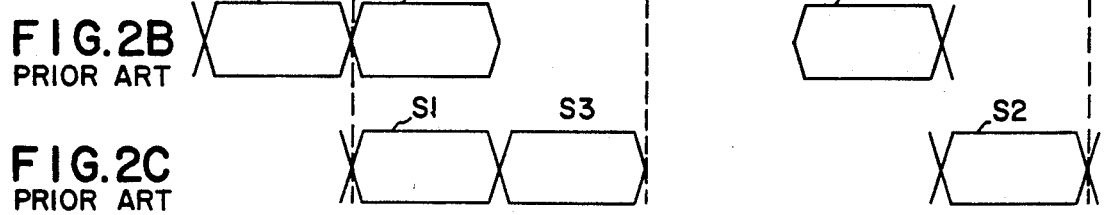

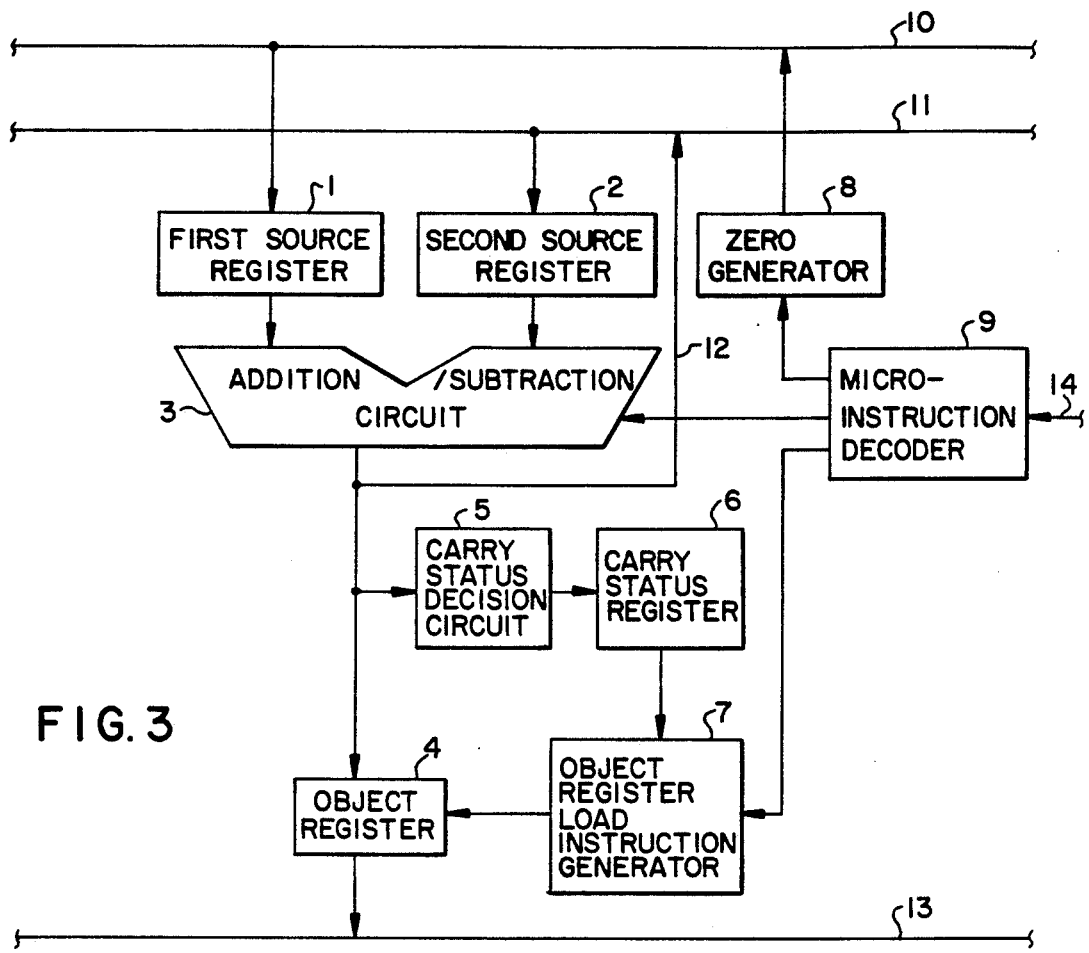
FIG. 3
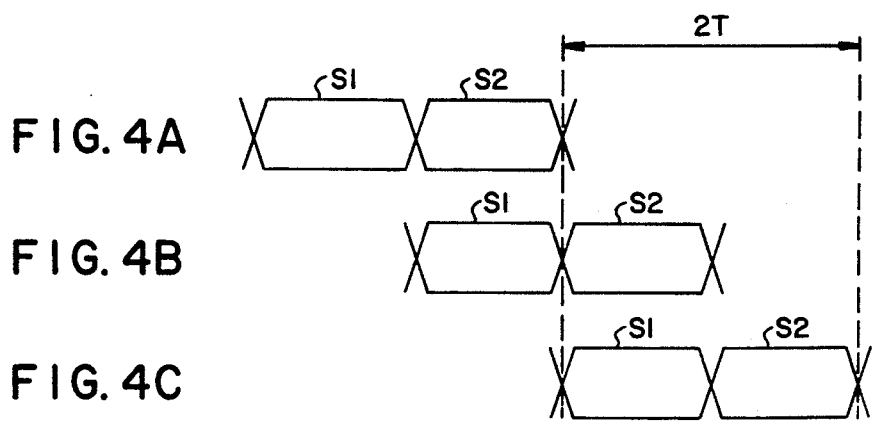
FIG. 4A
FIG. 4B
FIG. 4C

CIRCUIT ARRANGEMENT FOR DECIMAL ARITHMETIC

BACKGROUND OF THE INVENTION

The invention relates to a circuit arrangement for decimal arithmetic for performing decimal subtraction at a high speed.

In a conventional decimal arithmetic circuit arrangement, decimal arithmetic is usually performed by applying binary-coded decimal (BCD) numbers to a binary addition subtraction circuit. In the conventional circuit arrangement, when a borrow occurs at the most significant digit position of a minuend because the subtrahend is larger than the minuend, it becomes necessary to take a correction step of obtaining the 10's complement of the result of the subtraction. Whether such a correction step should be taken is usually determined by a conditional branch microinstruction.

An example of the conventional circuit arrangement for decimal arithmetic is disclosed in Section 6.6, pp. 230-243 of a book entitled "Computer Organization and Microprogramming" by Yaohan Chu, published in 1972 from Prentice-Hall, Inc. However, the conventional circuit arrangement is disadvantageous in that, as described in more detail hereinafter, when the flow of an arithmetic processing is branched out by a conditional branch microinstruction, the pipeline processing is disturbed in the circuit arrangement which increases the time required for the arithmetic processing.

An object of the invention is, therefore, to provide a circuit arrangement for decimal arithmetic free from the above-mentioned disadvantages of the conventional arrangement.

SUMMARY OF THE INVENTION

According to an aspect of the invention, there is provided a circuit arrangement for decimal arithmetic which comprises: a binary arithmetic means which receives a minuend stored in a first register and a subtrahend stored in a second register to perform a subtraction of the subtrahend from the minuend and to store the result of the subtraction in a third register; carry status decision means for producing a first signal as a carry status when a borrow has occurred in the subtraction and a second signal as the carry status when no borrow has occurred; zero generation means for generating zero; a carry status register for holding the carry status given from the carry status decision means; and inhibition means for inhibiting the result of the subtraction in the binary arithmetic means from being stored in the third register when the carry status register holds the second signal; wherein after a first subtraction by the arithmetic means, the result of the first subtraction is stored in the second register, the zero given from the zero generation means is stored in the first register and a second subtraction of the content of the second register from that of the first register is executed in the binary arithmetic means.

BRIEF DESCRIPTION OF THE DRAWINGS

Other features and advantages of the invention will become more apparent from the following detailed description when taken in conjunction with the accompanying drawings in which:

FIG. 1 is a flow diagram of the operation of a conventional circuit arrangement;

FIGS. 2A through 2C are timing charts showing a pipeline flow in the conventional circuit arrangement;

FIG. 3 shows a block diagram of an embodiment of the invention;

FIGS. 4A through 4C are timing charts describing pipeline control in the embodiment; and FIG. 5 shows a flow diagram of the embodiment.

DETAILED DESCRIPTION OF THE PREFERRED EMBODIMENT OF THE INVENTION

For an easy understanding of the invention, a conventional circuit arrangement for decimal arithmetic will first be described. In the arrangement, a conventional decimal subtraction operation is performed according to a flow diagram shown in FIG. 1. A microinstruction (DSUB) for decimal subtraction is first executed (Step 201), and a microinstruction for carry-status-dependent conditional branch is then executed (Step 202). When the carry status obtained by the execution of the DSUB microinstruction is a logical "1" (which means that no borrow occurs), the decimal subtraction operation is completed by the execution of the two microinstructions. However, when the carry status is "0", or when a borrow occurs, a correction microinstruction (RECOM) has to be executed further (Step 203), requiring the execution of three microinstructions.

FIGS. 2A through 2C are timing charts showing a pipeline flow in the conventional circuit arrangement for decimal arithmetic. FIGS. 2A, 2B and 2C represent a fetch stage, a decode stage and an execution stage, respectively. Namely, the circuit arrangement has a three-stage pipeline structure. Assuming that Steps S1, S2 and S3 correspond to the DSUB microinstruction, the RECOM microinstruction and the carry-status-dependent conditional branch microinstruction, respectively and that each of Steps S1, S2 and S3 takes Time T called "cycle time", the time required to execute a decimal subtraction operation becomes 5T if the RECOM microinstruction should be executed. This is because the fetch operation of the RECOM microinstruction at the fetch stage does not occur until the execution of the branch microinstruction is completed at the execution stage.

An embodiment of the invention will next be described in detail.

Referring to FIG. 3, an embodiment of the invention comprises a first source register 1 for storing one of two operands for arithmetic; a second source register 2 for storing the other operand for arithmetic; a binary addition/subtraction circuit 3 responsive to the two operands given from the registers 1 and 2 for performing a binary operation thereon; an object register 4 for storing the operation result produced from the circuit 3; a carry status decision circuit 5 which produces a logical "0" signal when a borrow occurs in an operation made by the circuit 3 and produces a logical "1" signal when no borrow occurs; a carry status register 6 for storing a signal sent from the circuit 5; an object-register-load-instruction generator 7 which generates a load instruction signal and sends the same to the register 4 so as to store the same in the register 4, a zero generator 8 for producing "0" in BCD representation to be loaded in the register 1; a microinstruction decoder 9 which decodes microinstructions sent from a control storage (not shown) via a path 14 and transmits control signals obtained by decoding each microinstruction to respective associated circuit elements; a first source bus 10 for transmitting an operand to be loaded in the register 1; a second source bus 11 for transmitting an operand to be loaded in the register 2; and an object bus 13 for transmitting the contents of the register 4.

FIGS. 4A through 4C are timing charts describing pipeline control in the embodiment. These drawings illustrate a fetch stage, a decode stage and an execution stage, respectively, for three-stage pipeline control. Description will next be made of the decimal subtraction operation of the embodiment referring to FIG. 5.

First, a minuend is loaded in the register 1 via the bus 10 and a subtrahend is loaded in the register 2 via the bus 11. Then, a decimal subtraction operation is instructed to be executed. As a result, a microinstruction (DSUB) for decimal subtraction is executed (Step 101 in FIG. 5). In other words, the DSUB microinstruction is decoded by the decoder 9 which in turn sends the resultant control signals to the respective associated circuit elements so that the circuit 3 performs a subtraction operation on the minuend and the subtrahend delivered from the registers 1 and 2 and loads the result of the subtraction operation into the register 4 as well as into the register 2 through a bypass route 12. At the same time, the circuit 5 judges whether a borrow has occurred in the subtraction operation by the circuit 3. The circuit 5 loads the logical "0" signal, if a borrow has occurred, and loads the logical "1" signal, if no borrow has occurred, into the register 6.

Then, a microinstruction (RECOM) for correction is executed (Step 102 in FIG. 5). More particularly, when the RECOM microinstruction is decoded by the decoder 9 and the resultant control signals are sent out to the respective associated circuit elements, the generator 8 generates "0" to be stored in the register 1 through the bus 10. Under the circumstances, a decimal subtraction operation is executed again. Whether or not the result of the subtraction operation should be loaded in the register 4 is judged by the generator 7 depending on the content of the register 6. In response to a load instruction signal from the generator 7 to the register 4, the result of the subtraction operation is loaded in the register 4. Conversely, when the generator 7 does not send the load instruction signal, the subtraction result is not loaded in the register 4.

The above-mentioned operation is now described in more detail.

i) In the case where a subtrahend is smaller than a minuend:

When a decimal subtraction of (543−234) is executed, for instance, "543" in BCD representation is first loaded in the register 1 while "234" in BCD representation is loaded in the register 2. After the DSUB microinstruction is next executed, the registers 4 and 2 are supplied with the subtraction result which in this case is "309" in BCD representation (equation (1)). Since the subtrahend is smaller than the minuend in this example, the logical "1" signal is given to the register 6 from the circuit 5.

$$\begin{array}{r} 543 \\ -234 \\ \hline 309 \end{array} \quad (1)$$

$$\begin{array}{r} 000 \\ -309 \\ \hline 309 \end{array} \quad (2)$$

With the execution of the RECOM microinstruction, is executed, "0" is loaded into the register 1 from the generator 8 to carry out a subtraction of (000−309) (equation (2)). However, since the content of the register 6 is still the logical "1", the generator 7 does not send the load instruction signal to the register 4. Therefore, the result of the subtraction of (000−309) is not loaded in the register 4, and the content of the register 4 is maintained at "309". As a result, since the register 6 is kept at the logical "1", a positive sign is attached to the content, or "309", of the register 4, and the result "+309" is finally obtained.

ii) In the case where a subtrahend is larger than a minuend:

When a decimal subtraction of (234−543) is executed, for instance, "234" in BCD representation is loaded in the register 1 and "543" in BCD representation is loaded in the register 2. Then, the DSUB microinstruction is executed, and the registers 4 and 2 are supplied with the result of the subtraction operation, or "691" in BCD representation (equation (3)). In this case, since the subtrahend "543" is larger than the minuend "234", the logical "0" signal is loaded in the register 6.

$$\begin{array}{r} 234 \\ -543 \\ \hline 691 \end{array} \quad (3)$$

$$\begin{array}{r} 000 \\ -691 \\ \hline 309 \end{array} \quad (4)$$

Subsequently, when the RECOM microinstruction is executed, "0" is loaded in the register 1 from the generator 8, "691" is loaded in the register 2 and a subtraction of (000−691) is executed (equation(4)). Because the content of the register 6 is the logical "0", the generator 7 sends the load instruction signal to the register 4. The result of the subtraction of (000−691), or "309", is consequently loaded in the register 4 to change its content from "691" to "309". As a result, since the content of the register 6 is the logical "0", a negative sign is attached to the content of the register 4, or "309", and the result "−309" is finally obtained.

As described above, regardless of whether the minuend or subtrahend is larger, decimal subtraction operation becomes quite simple because only two microinstructions, i.e., the DSUB microinstruction and the RECOM microinstruction, have to be executed for the decimal subtraction operation.

In FIGS. 4A through 4C, assuming that Steps S1 and S2 correspond to the DSUB microinstruction and the RECOM microinstruction, respectively, and that each of Steps S1 and S2 takes the same time T as Steps S1, S2 and S3 in FIGS. 2A to 2C, the time required to execute the decimal subtraction operation becomes as small as 2T as shown in FIG. 4C.

What is claimed is;

1. A circuit for decimal arithmetic comprising:
 (a) a first register for storing a minuend in Binary Coded Decimal (BCD) representation,
 (b) a second register for storing a subtrahend in BCD representation,
 (c) a third register,
 (d) a carry status decision means for producing a first signal as a carry status when the subtrahend is larger than the minuend and a second signal as the carry status when the subtrahend is less than the minuend in a first subtraction, (e) a carry status register connected to the carry status decision means for holding the carry status sent from the carry status decision means, (f) a zero generation means for generating a zero in BCD representation;

(g) a binary coded decimal subtraction means for receiving the minuend from the first register and the subtrahend from the second register, performing the first subtraction and after the first subtraction of the subtrahend from the minuend, storing a result of the first subtraction in the second register and in the third register, and subsequently storing the zero in the first register, and for subtracting the result of the first subtraction from the zero in the first register, and (h) an inhibition means for preventing the third register from storing the result of the second subtraction when the carry status register holds the second signal, the inhibition means further assigning a positive sign to the result in the third register if the preventing takes place and a negative sign to the result in the third register if no preventing occurs.

2. A circuit for performing decimal arithmetic, comprising:

(a) a first register, a second register, a third register and a carry status register, (b) a means for storing a first BCD number in the first register and a second BCD number in the second register, (c) a means for clearing the carry status register, (d) a subtracting means for performing a first subtraction by subtracting the second BCD number in the second register from the first BCD number in the first register, (e) a means for generating a carry signal when the second BCD number is larger than the first BCD number, (f) a means for setting the carry status register when the carry signal is generated, (g) a means for storing a result of the first subtraction in the second register and in the third register, (h) a means for generating a BCD zero and storing the BCD zero in the first register, (i) the subtracting means also being for performing a second subtraction by subtracting the result of the first subtraction in the second register from the zero in the first register, and (j) a means for storing a result of the second subtraction in the third register if the carry status register is set.

* * * * *